United States Patent [19]

Henderson et al.

[11] Patent Number: 4,864,093
[45] Date of Patent: Sep. 5, 1989

[54] EXOTHERMIC CUTTING ELECTRODE

[75] Inventors: Harold R. Henderson, Lancaster; Robert L. Strohl, Amanda, both of Ohio

[73] Assignee: Arcair Company, Lancaster, Ohio

[21] Appl. No.: 253,969

[22] Filed: Oct. 5, 1988

[51] Int. Cl.⁴ ............................................. B23K 35/04
[52] U.S. Cl. ...................................... 219/70; 219/72; 266/48
[58] Field of Search ................... 219/69 R, 69 W, 70, 219/72, 74; 110/349; 431/99; 266/48

[56] References Cited

U.S. PATENT DOCUMENTS

| | | | |
|---|---|---|---|
| 1,773,653 | 8/1930 | Turner | |
| 2,345,758 | 4/1944 | Lincoln et al. | 219/10 |
| 2,806,128 | 9/1957 | Muller | 219/146 |
| 3,147,362 | 9/1964 | Ramsey et al. | 219/146 |
| 3,260,076 | 7/1966 | Homberg | 67/34 |
| 3,487,791 | 1/1970 | Dalm | 110/1 |
| 3,500,774 | 3/1970 | Meier | 110/1 |
| 3,507,230 | 4/1970 | Seib | 110/1 |
| 3,507,231 | 4/1970 | Meier | 110/1 |
| 3,570,419 | 3/1971 | Brandenberger | 110/1 |
| 3,591,758 | 7/1971 | Clucas | 219/70 |
| 3,602,620 | 8/1971 | Fassler | 431/99 |
| 3,738,288 | 6/1973 | Brandenberger | 110/1 |
| 3,835,288 | 9/1974 | Henderson | 219/145 |
| 4,069,407 | 1/1978 | Brower | 219/70 |
| 4,182,947 | 1/1980 | Brower | 219/70 |
| 4,391,209 | 7/1983 | Moore | 110/349 |
| 4,437,649 | 3/1984 | Rieppel et al. | 266/48 |
| 4,544,139 | 10/1985 | Moore et al. | 266/48 |
| 4,573,665 | 3/1986 | Strohl et al. | 266/48 |
| 4,697,791 | 10/1987 | Henderson et al. | 266/48 |

Primary Examiner—A. D. Pellinen
Assistant Examiner—Geoffrey S. Evans
Attorney, Agent, or Firm—James C. Simmons

[57] ABSTRACT

An exothermic cutting electrode or burning bar having an oxidizable metal fluid conduit (tube) surrounded by alternate layers of wire wound helically in opposite directions, the entire structure covered with an outer oxidizable metallic tube, either end of the electrode being adapted for connection to a source of oxidizing fluid and electric current, so that an arc can be struck between a work-piece and the free end of the electrode to produce a cutting flame. By proper selection of the type and size of materials of construction the electrode will burn after the electric current has been turned off.

12 Claims, 1 Drawing Sheet

EXOTHERMIC CUTTING ELECTRODE

TECHNICAL FIELD

This invention pertains to exothermic cutting electrodes or burning bars of the type wherein a mass of metal is ignited in the presence of an oxidizing gas (e.g. oxygen) to form a flame or products of combustion which can be directed at a structural shape for cutting or piercing the structural shape.

BACKGROUND OF THE PRIOR ART

Conventional burning bars which are used on land for cutting structural materials such as rock, stone, concrete, iron and steel are disclosed in any of U.S. Pat. Nos. 3,260,076; 3,507,231; 3,487,791; 3,500,774; 3,507,230; 3,570,419; and 3,738,288. These burning bars share a common feature in that they have an outer tube within which is placed a plurality of elongated rods or wires to make up a mass of oxidizable metal. Oxygen is conducted down through the outer tube to the end of the rod where combustion is initiated to produce a flame which is directed at the structural material. The preferred burning bars usually contain a readily oxidizable metal (e.g. magnesium or aluminum) as one or more of the rods to promote combustion.

The use of multiple strands in various configurations for arc welding electrodes is shown in U.S. Pat. Nos. 1,773,653; 2,345,758; 2,806,128 and 3,147,362 it being well known that welding electrodes are generally unsuitable for cutting operations.

Twisted wire or cable type burning bars or thermal lances are shown in U.S. Pat. Nos. 3,591,758; and 3,602,620.

The multiple wire burning bar has been adapted to underwater use as shown in U.S. Pat. Nos. 4,069,407 and 4,182,947. The underwater rods of the aforementioned patents have an outer tube within which are disposed a plurality of elongated steel rods or wires the wire bundle including a readily oxidizable metal rod which is preferably aluminum.

A significant improvement to the exothermic cutting electrode or burning bars described above is disclosed and claimed in U.S. Pat. Nos. 4,391,209 and 4,437,649 assigned to the assignee of the present invention Patentees electrode uses, inter alia, a wire wound over an inner tube with this structure disposed within an outer tube to define the electrode. However, electrodes of this type have not been used for electrode diameters of greater than 5/16 inches.

BRIEF SUMMARY OF THE INVENTION

The present invention pertains to exothermic cutting electrodes or burning bars as they are known in the art. In particular the present invention provides an electrode having a central (inner) tube or oxygen passage around which is disposed alternate layers of helically wound wire which each layer wound in a direction opposite to that of its neighbor. The inner tube and alternate layers of wire are held to the inner tube in a number of ways the most prevalent being the use of an outer tube. However, ferrules can be crimped to the mass of metal to hold it to the inner tube and the entire length between the ferrules can be covered with a water impervious electrically insulating coating to provide the outer surface of the electrode. The inner tube and alternate layers of wire can be steel which is readily obtainable and easily fabricated which in the presence of oxygen conducted down the center tube will permit the establishment of a flame which can be directed against materials of construction to accomplish a cutting, boring, piercing or other severing operation. The inner or center tube insures that a jet of oxidizing gas and flame hits the workpiece with a concentrated force. According to the present invention electrodes are constructed so that an electrical current passed down through the mass of metal can be used to heat the end of the electrode in the presence of the stream of oxygen, to its ignition temperature and thuse start the progressive burning of the electrode mass producing a very high temperature flame. By proper selection of the metal and the proper relationship between the metal mass and metal surface in contact with the stream of oxygen (oxidizing gas), the current can be turned off once the flame from the burning mass of metal is established and the cutting can continue until the electrode is consumed.

DETAILED DESCRIPTION OF THE INVENTION

Figure 1:
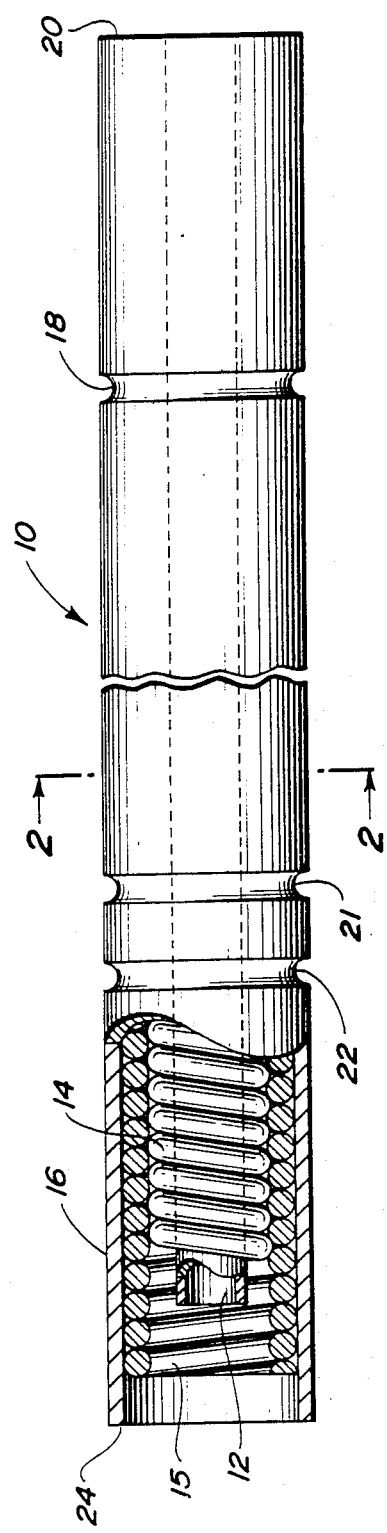
FIG. 1 is a partially fragmented perspective view illustrating an electrode according to the present invention.

The problem is to supply a one-half inch ($\frac{1}{2}$") or larger diameter exothermic cutting rod that will burn consistently, safely and with improved cutting performance over conventional "burning bars" or lances.

The present method of exothermic cutting using $\frac{1}{2}$" and larger diameter rods uses the "burning bar" lances constructed of pipe and filled with wires or bars of oxidizing materials. The problem with the burning bar is it is difficult to start and burns erratically and inconsistently.

The present invention is a $\frac{1}{2}$" and larger size exothermic cutting rod constructed of an inner tube or cutting rod such as shown in U.S. Pat. No. 4,697,791 with multiple layers of coiled wire coiled in alternating directions, i.e., first coil would left hand, second coil wound right hand, third coil wound left hand, etc. sheathed in an outer tube.

This invention solves the problem of constructing larger exothermic cutting electrodes as described in U.S. Pat. Nos. 4,391,209 and 4,437,649. For example; a single heavy walled tube of oxidizable material as used in cutting electrode disclosed in U.S. Pat. No. 3,835,288 will not burn exothermically because there is not enough area exposed to the oxygen flow to sustain continuous combustion. However, as surface area is increased (e.g. by providing a coil of material or wires, bars, etc.), exothermic combustion is achieved. Therefore there is some transition point relative to the mass of material and its exposed area to oxygen for exothermic combustion to be sustained in a stable condition. Providing multiple coils of oxidazable fuel rather than a single large cross sectional area material wound in a coil exposes more area and therefore provides a more stable and uniform exothermic burning electrode with greater cutting efficiency.

This invention provides all the advantages of the exothermic cutting electrode described in U.S. Pat. Nos. 4,437,649 and 4,391,209 while expanding its size into doing heavier work, i.e., piercing larger holes and burning heavier cross sections of material. By alternating the direction of winding the coils allows for a precision occupancy of space within the electrode construction by not allowing the coils to interlace with each other, but to ride on the tops of the wires and allowing a secure mechanical retention and maximum exposure to the oxygen.

An exothermic electrode or burning bar according to the present invention provides a mass of oxidizable metal that in the presence of an oxidizing gas (e.g. oxygen) and a source of ignition will produce a flame which can be directed against a workpiece which may be part of a fixed land structure or marine structure or similar object so that in the hands of the skilled operator a cutting, piercing or burning operation can take place. Electrodes according to the present invention can be used to burn, cut or pierce structural materials in air or water such as cast iron, steel, concrete and rock, the latter being either natural or synthetic.

Figure 2:
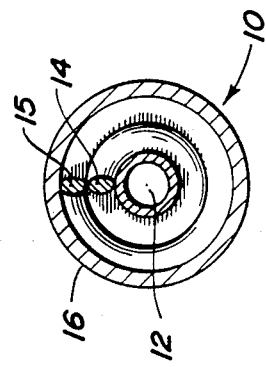
FIG. 2 is a view taken along the lines 2—2 of FIG. 1.

One form of the invention is shown in FIGS. 1 and 2, the electrode shown generally as 10 comprising as inner tube 12 the inner tube being a low carbon steel 17½ inches (44.45 cm) long having a 0.187 inches (4.75 mm) outside diameter and a 0.028 inches thick wall. Wrapped around tube 12 in a helical fashion is a first continuous length of low carbon steel wire 14 having a nominal diameter of 0.54 inches (13.7 mm). The steel wire is wound in such a fashion as to define a tube having a 0.306 inches (7.7 mm) outside diameter and a 0.187 inches (4.75 mm) inside diameter with an overall length of 17¾ inches (=45.09 cm). Wire 14 is wound so that it projects approximately 0.125 inches (3.18 mm) over the ends of inner tube 12. Disposed around wire 14 is a second helically wound steel wire 15 having a nominal The entire electrode 10 can then be coated with 0.015–0.020 inches (3.81 mm–5.08 mm) coating of an electrically insulating material such as vinyl sold by Michigan Chome and Chemical Company under the tradename MICRON 455 Vinyl. In use a portion of one end of the plastic coating can be stripped away so that the electrode can be clamped in a torch (not shown) such as desclosed in U.S. Pat. No. Des. 293,296. Alternatively the electrode 10 can be fabricated with a flux coating on the outer surface, one such coating being described and claimed in U.S. Pat. No. 4,544,139. It is possible to coat electrodes according to the present invention by clamping the outer tube in a fixture which will prevent adherence of the coating as it is applied.

Set forth in Table 1 is a series of comparative test of two one-half inch diameter electrodes, one fabricated in accord with FIG. 1 of U.S. Pat. No. 4,391,209 having an inner tube of 0.187 inches (4.75 mm) outside diameter and a 0.028 inches (0.71 mm) thick wall, a single helically wound wire coil disposed over inner tube fabricated from 0.1205 inches (3.06 mm) diameter wire to a coil with a 0.433 inch (11.0 mm) outside diameter and an outer tube having a 0.500 inch (12.7 mm) outside diameter with a 0.032 inch (0.81 mm) thick wall and the other electrode in accord with the present invention these electrodes having the structure and dimensions noted above. The materials of construction of both electrodes was the same e.g. low carbon steel. All of the electrodes were 36 inches (91.4 cm) long and were used to cut 1 inch (2.54 cm) thick carbon steel plate using eighty (80) psi oxygen pressure at the torch. Ignition of the electrodes was by means of an initial electric arc struck between the electrode and a striker using the equipment disclosed in U.S. Pat. No. 4,573,665.

TABLE I

| Rod No* | Length of Cut(in) | Length of Rod Used (inches) | Elapsed Time (min) | Cut/length of Rod | cut/min elapsed time |
|---|---|---|---|---|---|
| 1 | 8.000 | 21.2 | 0.714 | 0.376 | 11.209 |
| 2 | 9.000 | 18.7 | 0.650 | 0.480 | 13.849 |
| 3 | 9.500 | 21.1 | 0.723 | 0.450 | 13.142 |
| 4 | 9.375 | 23.5 | 0.811 | 0.399 | 11.566 |
| 5 | 9.500 | 21.1 | 0.730 | 0.450 | 13.022 |
| AVERAGE | — | — | — | 0.431 | 12.558 |
| 6 | 12.87 | 22.5 | 0.947 | 0.572 | 13.602 |
| 7 | 13.50 | 23.2 | 0.938 | 0.581 | 14.400 |
| 8 | 13.62 | 21.7 | 0.823 | 0.626 | 16.548 |
| 9 | 12.00 | 22.1 | 0.916 | 0.542 | 13.095 |
| 10 | 13.50 | 23.6 | 1.000 | 0.571 | 13.504 |
| AVERAGE | — | — | — | 0.579 | 14.230 |

*Rods 1–5 fabricated in accord with FIG. 1 of U.S. Pat. No. 4,391,209
Rods 6–10 fabricated in accord with present invention diameter of 0.54 inches (13.7 mm). Wire 15 is wound in the opposite direction to that of wire 14 to define a tube having a 0.420 inches (10.7 mm) outside diameter and a 0.306 (7.7 mm) inside diameter with an overall length of 17½ inches (44.45 cm). Disposed around the wire 14 is an outer tube 16 having an outside diameter of 0.500 inches (12.7 mm) with an overall length of 18 inches (45.72 cm). As shown in the drawing on the torch end 24 of the electrode 10 the outer tube 16 projects beyond wire 15 and wire 15 beyond wire 14 and wire 14 inner tube 12. On the burning end 20 the four components can be flush. As shown in FIG. 1 the assembly is held together by a series of crimps or dimples 18 disposed around the circumference of the electrode or rod 10 proximate one the flame end 20 and a double row of crimps or dimples 21, 27 proximate the other or torch end 24 of electrode 10.

From the foregoing table it is apparent that electrodes 6–10 performed better than electrodes 1–5 in both the amount of cut per inch of electrode or rod consumed and the amount of cut perminute of time. Comparing the averages from these two parameters shown in the table shows that the electrodes of the invention (6–10) were 25.5% better in cut per inch of rod and 11.7% better in cut per minute of time than the prior art electrode. This attributed to the use of multiple coil or helically wound wires as opposed to a single coil of wire. As electrode diameters increase it will be beneficial to use multiple coils as long as they are wound in opposite directions for each layer (e.g. right, left-right left, etc. or left-right-left-right etc.)

During the cutting tests the operator reported electrodes 6–10 were easier to ignite and burned more consistently than electrodes 1–5.

Having thus described our invention what is desired to be secured by Letters Patent of the United States is set forth in the appended claims.

We claim:

1. An exothermic cutting electrode for use on land or underwater of the type comprising a outer tube having disposed therein an inner tube concentrically aligned with and spaced apart from said outer tube and a mass of metal disposed between said inner and outer tubes the improvement comprising:

utilizing a plurality of layers of wire wound in alternate directions over said inner tube to define said mass of metal.

2. An electrode according to claim 1 wherein said outer tube has a minimum outside diameter of one-half inch.

3. An electrode according to claim 1 wherein there are two layers of wire wound in alternate directions around said inner tube.

4. An electrode according to claim 1 wherein on one end thereof said outer tube projects over said layers of alternately wound wire and said layers of alternately wound wire project over said inner tube to define a torch end manifold.

5. An electrode according to claim 1 wherein a first layer wire adjacent said inner tube is wound in a continuous helix where each turn of said helix is adjacent the previous turn of said helix.

6. An electrode according to claim 5 wherein a second layer of wire adjacent said first layer of wire is wound in a continuous helix where each turn of said helix is adjacent the previous turn of said helix.

7. An electrode according to claim 1 wherein the outer surface is covered by a water impervious electrically insulating coating.

8. An electrode according to claim 1 wherein the outer surface is covered by a flux coating.

9. A one-half inch or greater outside diameter exothermic cutting electrode comprising in combination:

a fluid oxidant tube of electrode length said tube fabricated from an oxidizable metal;

a first layer of wire fabricated from an oxidizable metal formed in a continuous helix and disposed over said fluxed oxidant tube;

a second layer of wire fabricated from an oxidizable metal and formed in a continuous helix wound in the opposite direction from said first layer, said second layer disposed over said first layer;

an outer tube fabricated from an oxidizable metal disposed over said second layer of wire; and means to hold said fluid oxidant tube, said first layer of wire, said second layer of wire and said outer tube in conventional relation to each other.

10. An electrode according to claim 9 wherein said outer surface is covered by a flux coating.

11. An electrode according to claim 9 wherein on one end thereof said outer tube projects over said second layer of wires, said second layer of wire projects over said first layer of wire and said first layer of wire projects over said fluid oxidant tube to define a torch end manifold.

12. An electrode according to claim 9 where in said means to hold said outer tube, first and second layers of wire and said fluid oxidant tube in concentric relation include a plurality crimps or dimples randomly spaced around the circumference the outer tube at either end of the electrode.

* * * * *